June 17, 1924.
G. B. CADY
1,497,839
OIL LEVEL GAUGE FOR MOTOR VEHICLES
Filed May 25, 1921
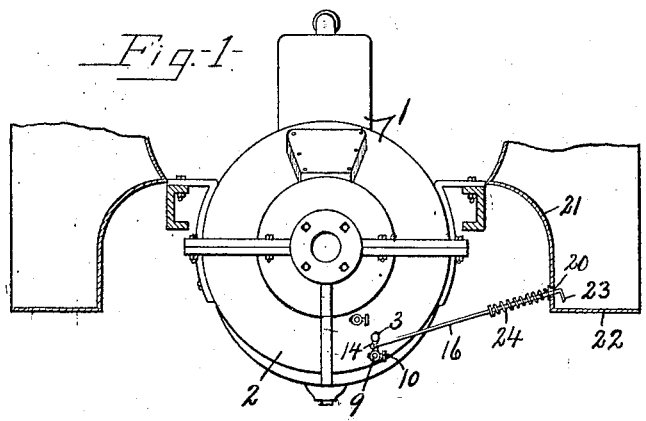
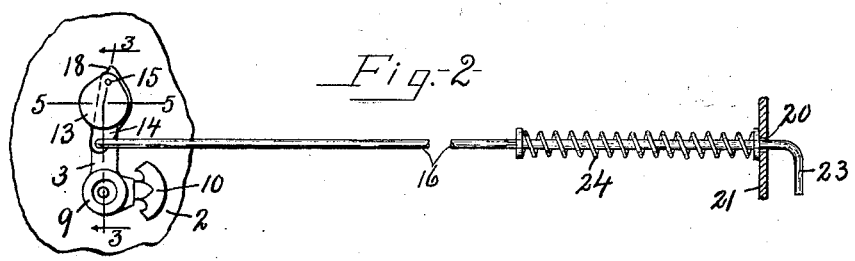
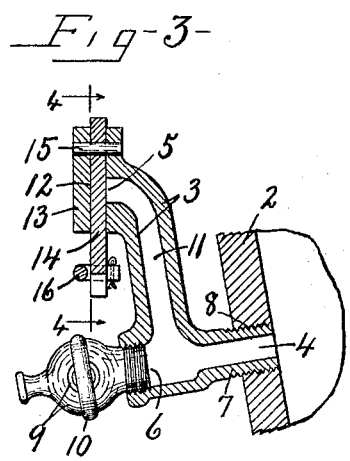
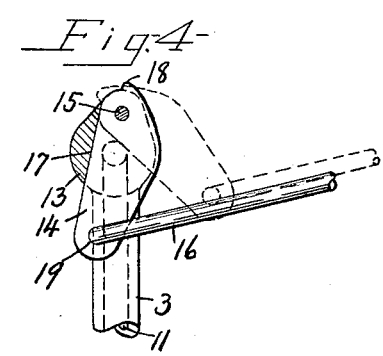
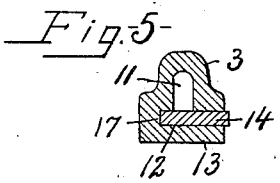
INVENTOR
Geo. B. Cady
BY
Howard P Denison
ATTORNEY Patented June 17, 1924.

1,497,839

UNITED STATES PATENT OFFICE.

GEORGE B. CADY, OF CANASTOTA, NEW YORK.

OIL-LEVEL GAUGE FOR MOTOR VEHICLES.

Application filed May 25, 1921. Serial No. 472,506.

*To all whom it may concern:*

Be it known that I, GEORGE B. CADY, of Canastota, in the county of Madison, in the State of New York, have invented new and useful Improvements in Oil-Level Gauges for Motor Vehicles, of which the following, taken in connection with the accompanying drawings, is a full, clear, and exact description.

This invention relates to a device for determining the oil level in the crank case of internal combustion engines as used more particularly in the operation of motor vehicles.

These oil levels are usually determined by one or more gauge cocks which are necessarily more or less concealed beneath the engine-bed and are, therefore, only accessible to the operator for testing purposes by assuming a reclining position beneath the machine.

I am aware that certain devices have heretofore been proposed to extend from the gauge cocks to the exterior of the machine above the running board for controlling purposes, and while I make use of a hand-operated controlling device extending to the exterior of the machine or above the running board for convenience of operation, the main object is to provide a gauge cock with a single inlet and two or more outlets at different levels, whereby the level test may be made through either cock one at a time from the top downward through a single tap in the crank case.

In other words, I have sought to provide a unitary valve case with separate valves at different levels and to connect the upper valve to the controlling device extending to the exterior of the case for test purposes, while the lower valve may serve as a drain cock or as a means for testing the lowest safe level.

Another object is to provide the valve case with a vertical slot opening from the under side and extending across the upper outlet for the reception of a gate valve, which is pivoted to the valve case in such manner as to swing to and from a position across said outlet and thereby to close and open the same as may be necessary in making the level test.

Other objects and uses relating to specific parts of the device will be brought out in the following description.

In the drawings:

Fig. 1 is an end view of an engine showing the adjacent portions of the opposite running boards and side plates together with the adjacent portions of the frame in section, and also showing my improved gauge cock in operative position.

Fig. 2 is an enlarged face view of the level testing mechanism partly broken away.

Fig. 3 is an enlarged sectional view of the gauge cock and adjacent portion of the crank case to which it is secured taken on line 3—3, Fig. 2.

Fig. 4 is a sectional view of a portion of the same gauge cock taken in the plane of line 4—4, Fig. 3.

Fig. 5 is a detail enlarged sectional view taken on line 5—5, Fig. 2.

In order that my invention may be clearly understood, I have shown an internal combustion engine —1— having a crank case —2— provided with a valve case —3— having an inlet —4— and outlets —5— and —6— disposed in different horizontal planes or levels one above the other and both communicating with the inlet —4—.

The portion of the valve case —3— having the inlet —4— is provided with an externally threaded nipple —7— which is screwed into a threaded opening —8— in the crank case —2— near the bottom thereof to permit the oil to flow from the crank case into the valve case. The outlet —6— is disposed in nearly the same horizontal plane or level as the inlet —4— and is provided with a drain cock —9— of any suitable construction for draining off the oil from the crank case, but is normally closed and is provided with a hand-piece —10— by which the valve may be operated to make the desired low level emergency test or for drainage purposes.

The valve case —3— extends upwardly some distance above the outlet —6— and is provided with a passage —11— connecting the outlet —5— with the inlet —4—, said outlet —5— being located at the upper end of the passage —11— and, therefore, some distance above the outlet —6— and inlet —4— to test the presence or absence of oil in the crank case at a higher level than the outlet —6—.

The passage —11— stands in nearly a vertical position while the upper outlet —5— forming the terminal upper end of the passage —11— is disposed in substantially a horizontal plane and communicates with a vertical slot —12— extending upwardly from the under side of a lateral offset —13— of the case —3— to a plane slightly above the outlet —5— for receiving a gate valve —14— having its upper end pivoted at —15— to the lateral offset —13— above the outlet —5— and its lower end extending downwardly through the slot —12— and beneath the lower edge of the offset —13— where it is connected to an operating rod —16—, presently described.

The opposite walls of the slot —12— are spaced substantially the same width as the thickness of the gate valve —14—, which also has its opposite faces flat and parallel and of considerably greater area than the cross-section area of the discharge opening or outlet —5— so as to effectively close the latter when the gate valve is in its closed position, the outer wall of the slot being imperforate to cause the escaping oil to flow from the outlet —5— downwardly through the open lower side of the slot —12— when the gate valve —14— is open as shown by dotted lines in Fig. 4.

The rear side of the slot is closed to form an abutment —17— which limits the closing movement of the valve —14—, said valve having its upper end provided with a radial shoulder —18— adapted to limit the opening movement of said valve.

The operating rod —16— has its inner end pivotally attached at —19— to the lower end of the gate valve —14— while its outer end extends through an opening —20— in one of the side plates —21— of the body of the car above the running board —22— and is provided with a handle —23— by which it may be operated or drawn outwardly against the action of the retracting spring —24— to open the valve —14—, said spring serving to automatically close the valve through the medium of the rod —16— when the latter is released.

The height of the outlet —5— above the bottom of the crank case or oil chamber therein corresponds to what may be termed the safe level of the oil in said crank case for lubricating the various parts of the engine and by having the valve —9— normally closed, it is evident that the oil when at the safe level or above will rise in the passage —11— to at least the level of the outlet —5—, and in order to determine whether or not the oil is at the safe level, it is simply necessary to pull the rod —16— outwardly which will open the valve —14— and allow the oil to drop on to the ground or in some receptacle provided therefor where it is readily visible to the operator, the valve rod —16— being then released to allow its operation to close the valve —14— by means of the spring —24—.

If the oil does not escape through the outlet —5— when the valve —14— is opened, it indicates that the supply in the reservoir must be shortly replenished at which time, the valve —14— may be held open to indicate by the dropping of the oil during the refilling that it has reached the desired safe level.

When it is desired to drain off the oil from the tank, it is simply necessary to open the valve —9— which may also serve to indicate the lowest level of the oil in the crank case.

What I claim is:

An oil level gauge for motor vehicles, comprising an upright valve case having its lower end provided with a laterally projecting nipple for securement to the crank case of an internal combustion engine and its upper end provided with an outwardly projecting offset some distance above the nipple, said upper offset being provided with a vertical slot communicating with the oil passage in the valve case and open at one side, the opposite side of the slot being closed to form a stop, a valve hinged to the valve case to swing in said slot to and from a position across the adjacent end of the oil passage and normally spring pressed against said stop, and an operating member connected to the lower end of the valve and extending outwardly therefrom for opening the same against the action of the spring.

In witness whereof I have hereunto set my hand this twentieth day of May 1921.

GEO. B. CADY.

Witnesses:
M. M. WAGNER,
L. D. WILLIAMS.